Oct. 7, 1952 R. H. HALVORSEN 2,613,265

MESSAGE NUMBERING DEVICE

Filed July 9, 1949 3 Sheets-Sheet 1

INVENTOR
RALPH H. HALVORSEN
BY Emery Robinson
ATTORNEY

Oct. 7, 1952 R. H. HALVORSEN 2,613,265
MESSAGE NUMBERING DEVICE
Filed July 9, 1949 3 Sheets-Sheet 2
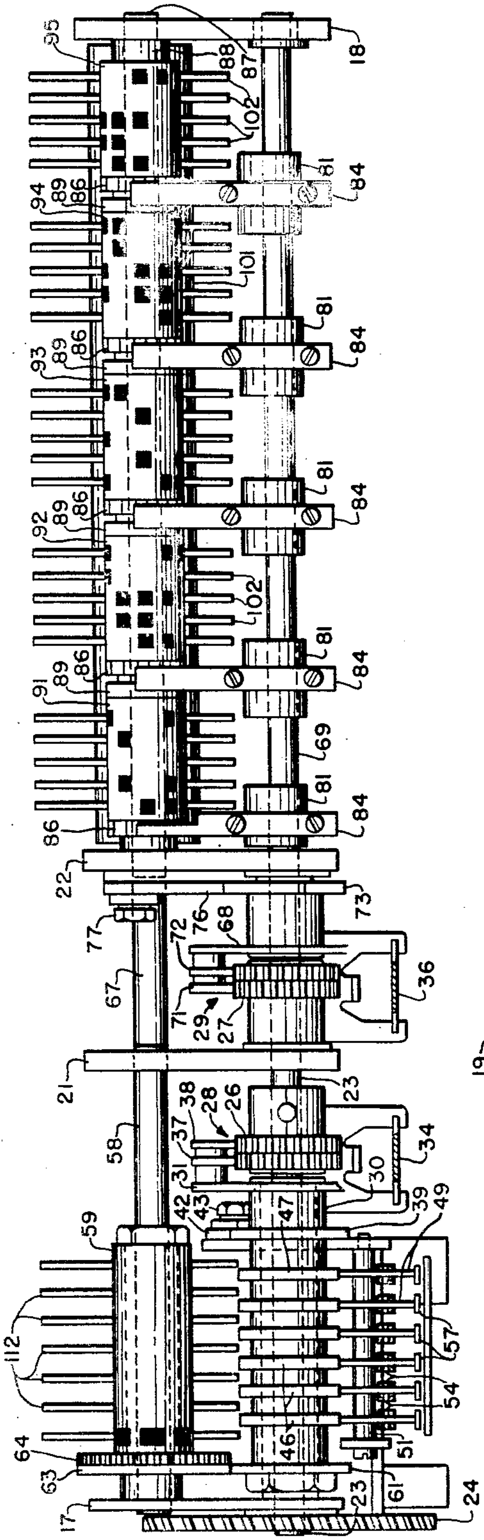
FIG. 2
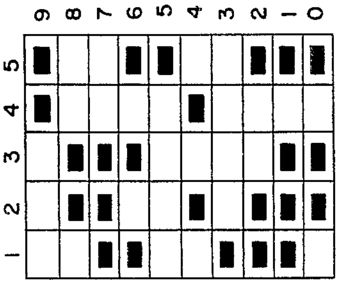
FIG. 7
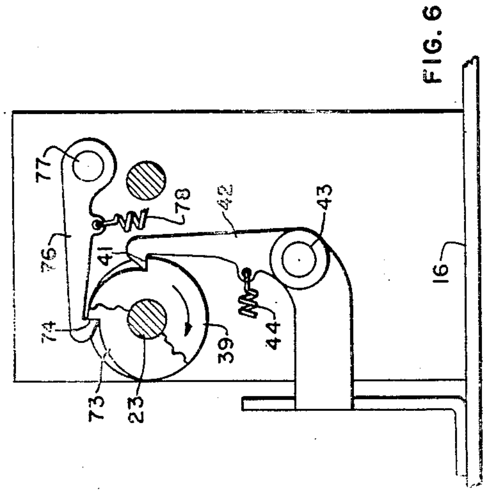
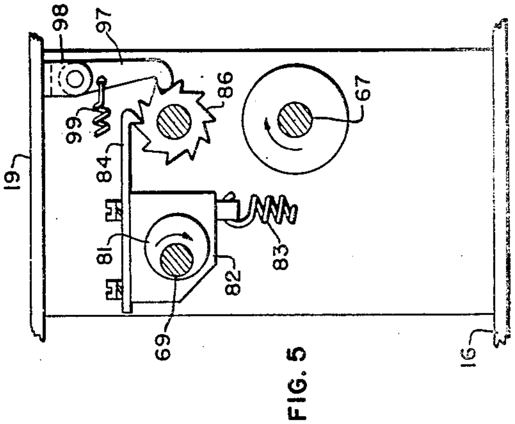
FIG. 5
INVENTOR
RALPH H. HALVORSEN
BY Emery Robinson
ATTORNEY Oct. 7, 1952 R. H. HALVORSEN 2,613,265

MESSAGE NUMBERING DEVICE

Filed July 9, 1949 3 Sheets-Sheet 3

INVENTOR
RALPH H. HALVORSEN
BY Emery Robinson
ATTORNEY

Patented Oct. 7, 1952 2,613,265

UNITED STATES PATENT OFFICE 2,613,265

MESSAGE NUMBERING DEVICE

Ralph H. Halvorsen, Chicago, Ill., assignor to Teletype Corporation, Chicago, Ill., a corporation of Delaware Application July 9, 1949, Serial No. 103,769

12 Claims. (Cl. 178—17)

This invention relates to telegraph transmitting apparatus and more particularly to apparatus for introducing message numbering signals in accompaniment with consecutive messages.

In telegraph offices of the present day it has become common practice to identify messages with numerical identification. Obviously it is most convenient that the identifying numbers on consecutive messages be consecutive numbers. As can be seen readily when consecutive numbers are utilized to number and identify consecutive messages the handling of these messages is facilitated considerably. At the receiving station it is easy for an operator to scan a group of messages which have been received, perhaps during the preceding twelve or twenty-four hour period, and readily ascertain if one or more of the consecutively numbered messages have not been received. If it happens to be the custom to maintain a file of received messages the identifying numbers on each message will facilitate the maintenance of such a file.

At telegraph transmitting stations it has become rather general practice, where the practice is to identify each transmitted message, to utilize the consecutive number method of identification. Devices are known which are capable of generating consecutive numeral identification signals and then inserting such signals in consecutive messages. Thus the operations necessary for inserting the identification signals into the messages at the transmitting station are rendered automatic. If, after any message bearing such an identifying number, such message is improperly received at its point of destination, it is a relatively simple matter to locate the copy of the message retained by the transmitting station by means of the identifying number appearing thereon and retransmit the message.

In certain communication systems it has become the practice to print messages on forms of uniform length. Such practice greatly facilitates the handling of such messages. When such forms are being utilized obviously they render themselves readily adaptable to the practice of numeral identification. When messages are received on standard length forms it has been found that occasionally certain messages require more printing space than is provided on a single form. Under such conditions it is desirable that each form bearing any portion of the message also bear the same identifying number. With the numbering transmitters in use at the present time this cannot be readily accomplished due to the fact that they automatically transmit consecutive numbers with each operation, and are not adapted for transmitting the same number more than once. The desirability of inserting the same identifying number on each form bearing parts of a single message has been referred to merely for the purpose of illustrating the need for a device by which it is possible to generate and transmit either the same number signal during successive operations of the device or consecutive number signals during successive operations thereof.

Accordingly, a principal object of the present invention is to provide a message numbering device whereby either the same number may be transmitted successively or consecutive numbers may be transmitted successively.

Another object of the invention is to provide a message numbering device which responds to the completion of one circuit by transmitting a number which is the same as the last previously transmitted number and which responds to the completion of another circuit by transmitting the next consecutive number following the last number previously transmitted.

In general the invention employs a plurality of coded drums, one of which is a control drum or cam and the rest of which are coded with numeral designations. In the embodiment of the invention disclosed herein there are five numeral code drums which thus enable transmission of digits in the units, tens, hundreds, thousands, and ten thousands, positions. Stepping means are provided which step the units code drum during each operation. The tens code drum is stepped once each time the units code drum is stepped ten times, the hundreds code drum is stepped once each time the tens code drum is stepped ten times, etc. There is a sequence cam provided for controlling the successive transmission of the digits as determined by the ten thousands, thousands, hundreds, tens, and units code drums. When a first circuit is closed a number corresponding to an existing setting of the numeral code drums is transmitted, and when a second circuit is closed the stepping means is actuated to advance the code drums to a position corresponding to the next consecutive number and a number corresponding to this new setting of the code drums is transmitted.

Having in mind the objects and features of the invention already referred to other objects and advantages will present themselves and the invention will be more readily understood from the following detailed description when read in conjunction with the appended drawings wherein:

Fig. 2 is a top plan view of the invention;

Fig. 5 is a fragmentary sectional view taken substantially along the line 5—5 of Fig. 1 showing the stepping mechanism for the numbering cams;

Fig. 6 is a sectional view taken substantially along the line 6—6 of Fig. 1 showing the stop detents for the numbering cam stepping shaft and the main transmitter cam sleeve;

Fig. 7 is a schematic representation of any one of the numbering cams;

Figure 1:
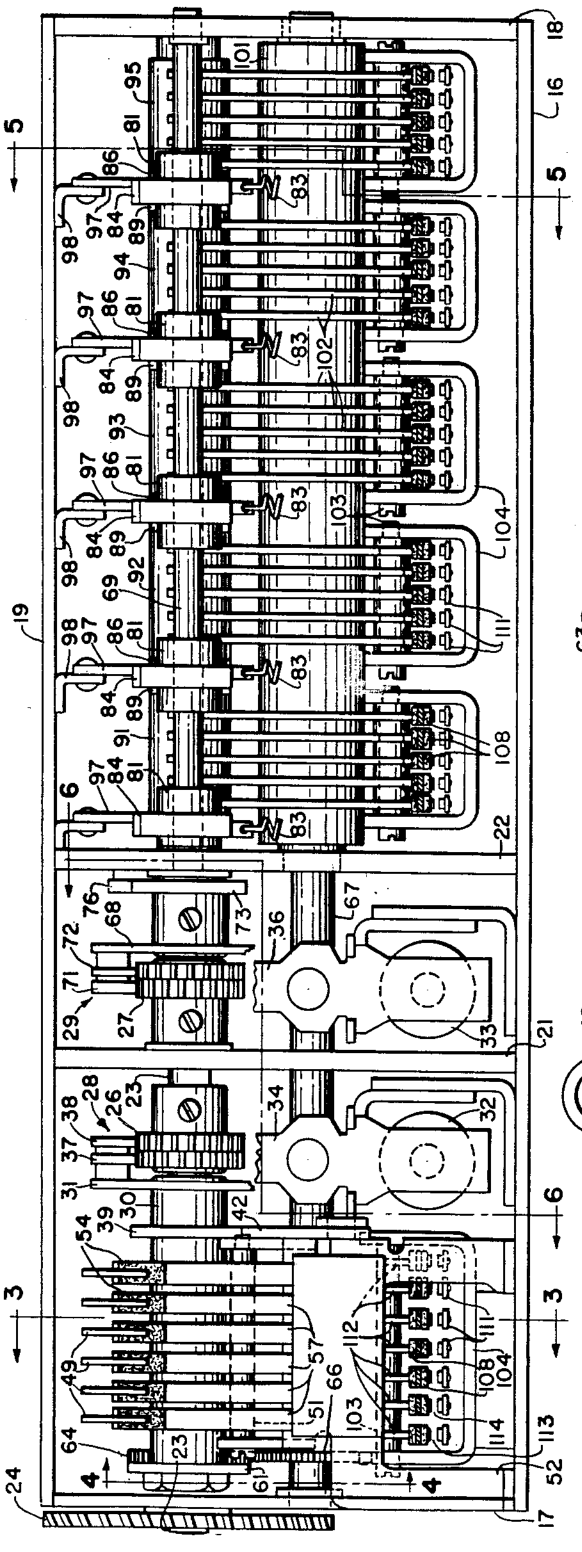
Fig. 1 is a front elevational view of the numbering transmitter forming the subject matter of the invention.

Referring now to the drawings a base 16 is provided to which a pair of end plates 17 and 18 are secured. A top plate 19 is suitably secured to the end plates 17 and 18. A pair of supporting plates 21 and 22 are also secured suitably to the base 16 and top plate 19. A shaft 23 is mounted suitably for rotation in a pair of journals (not shown) in the plates 17 and 21, and carries a power gear 24. Secured to the shaft 23 are a pair of drive members 26 and 27 of a pair of clutches 28 and 29 of the type shown in Figs. 3 and 3A in the copending U. S. patent application of G. G. Keyes, Serial No. 786,171, filed November 15, 1947. The clutch 28 has a driven member 31 which is secured to a sleeve 30 rotatable relative to the shaft 23. The clutches 28 and 29 each are provided with their individual control magnets 32 and 33 with which armatures 34 and 36 cooperate respectively. The armature 34 is so designed as to control a pair of pawls 37 and 38 which engage the drive member 26. The pawls 37 and 38 are secured pivotally to the driven member 31 and upon energization of the magnet 32 and consequent pulling up of the armature 34 the pawls 37 and 38 are released and permitted to engage the drive member 26. Upon the completion of a revolution of the driven member 31, with the magnet 32 deenergized, the armature 34 blocks further rotation of the driven member 31 by disengaging the pawls 37 and 38 from the drive member 26. A cam 39 mounted integrally on the sleeve 30 is provided with a single tooth 41 with which a follower detent 42, mounted pivotally on a bolt 43, cooperates. A spring 44 urges the detent 42 counterclockwise continuously against the cam 39. When the armature 34 engages the driven member 31, upon completion of a revolution thereof, there is a tendency for the sleeve 30 and driven member 31 to bounce in a direction opposite to the direction of rotation. The detent 42 slips over the tooth 41 just as the armature 34 stops rotation of the driven member 31 and therefore engages the tooth 41 when the driven member tends to bounce, thereby preventing the bounce and retaining the driven member 31 in a position whereby the pawls 37 and 38 are prevented from engaging the drive member 26.

The sleeve 30 has the usual series of five transmitting cams 46 and a start stop cam 47. Each of these cams 46 and 47 has a cut out portion 48, the cut out portions 48 in each cam being spaced relatively in order to enable the generation of signals comprising five equal length impulses and a stop impulse. A series of gooseneck levers 49 are mounted pivotally on a shaft 51, which shaft 51 is mounted suitably on a support 52 secured to the base 16. Each of the gooseneck levers 49 has a follower 53 which cooperates with the corresponding cam 46 or 47. Each of the gooseneck levers 49 cooperates with a movable spring contact 54. The spring contacts 54 are all insulated from each other, being mounted in an insulator block 56 secured to the support 52, and constantly tend to move counterclockwise towards corresponding stationary contacts 57 also mounted in the insulator block 56. The spring contacts 54 are constantly in engagement with the corresponding gooseneck levers 49 and thus retain the followers 53 in engagement with the cams 46 and 47.

A shaft 58 is mounted rotatably in the end plate 17 and supporting plate 21 and has a sleeve 59 rotatable therewith. The sleeve 30 has a gear 61 having a single tooth 62 which meshes with a six toothed gear 63 secured to the sleeve 59 and therefore the sleeve 59 completes a revolution upon each six revolutions of the sleeve 30. A gear 64 mounted on the sleeve 59, rotatable with the gear 63, meshes with a gear 66 secured to a sequence cam shaft 67, the shaft 67 being rotatably mounted in the end plates 17 and 18 and in the supporting plates 21 and 22. It will be obvious that the sleeve 59 is rotated in a stepped manner due to the effect of the single tooth 62 in engaging the teeth of the six toothed gear 63.

The drive member 27 of the clutch 29 is adapted to drive a driven member 68 secured to a shaft 69 mounted rotatably in the end plate 18 and supporting plate 22. The armature 36 of the magnet 33 cooperates with a pair of pawls 71 and 72 mounted pivotally on the driven member 68 in the same manner as the armature 34 cooperates with the pawls 37 and 38, and thereby controls the rotation of the driven member 68. A cam 73 having but a single tooth 74 is secured to the shaft 69 and has a cooperating detent 76 mounted pivotally on a bolt 77 secured to the supporting plate 22. The detent 76 is spring urged counterclockwise by a spring 78 so as to engage the cam 73 continuously. When the armature 36 is released by the magnet 33 while the driven member 68 rotates, the armature 36 engages the driven member just as the detent 76 overrides the tooth 74. Therefore the tooth 74 in cooperation with the detent 76 prevents any bounce of the driven member 68 when it is stopped by the armature 36.

The shaft 69 has a group of eccentrics 81 secured thereto which rotate whenever the shaft 69 makes a revolution. A block 82 provided for each eccentric 81 is urged clockwise by individual springs 83, thus continuously urging a pawl 84 towards a corresponding ratchet 86 on each one of a set of numbering code drums 91–95. The numbering code drums 91–95 are all mounted rotatably on a shaft 87 secured in the end plate 18 and supporting plate 22. Each of the numbering code drums 91–95 is maintained in the proper spaced alignment on the shaft 87 by spacer collars 88, and each is provided with one of the ratchets 86, while the drums 91–94 are also provided with cams 89 having but a single notch 96 therein. Each of the code drums 91–95 is rotatable individually on the shaft 87.

The code drums 91–95 represent respectively the units, tens, hundreds, thousands, and ten thousands code drums. With each complete rotation of the shaft 69, the eccentrics 81 oscillate the pawls 84 to the left (Fig. 5) and back to the right as shown. Invariably the pawl 84 cooperating with the ratchet 86 on the units code drum 91 advances the units code drum 91 a step with each rotation of the shaft 69. The pawl 84 that cooperates with the ratchet 86 on the tens code drum 92 also rides the cam 89 on the units code drum 91. Due to the fact that there is but one notch 96 in this cam 89 it is readily obvious that the pawl 84 is ineffective to advance the tens code drum 92 during rotation of the shaft 69 except when the notch 96 is aligned with the pawl 84 so as to enable the pawl to engage a tooth of the ratchet 86 on the tens code drum 92. Each of the code drums 91–94 is provided with a single notched cam 89 and as there are ten teeth in each of the ratchets 86, it is clear that the units code drum 91 is stepped ten times for each step of the tens code drum 92, that the tens code drum 92 is stepped ten times for each step of the hundreds code drum 93, that the hundreds code drum 93 is stepped ten times for each step of the thousands code drum 94, and that the thousands code drum 94 is stepped ten times for each step of the ten thousands code drum 95. Each of the code drums 91–95 is retained in each of its stepped positions by means of detents 97 secured pivotally to brackets 98 affixed to the top plate 19 and urged towards the ratchets 86 by individual springs 99.

Figures 9, 10, 11:
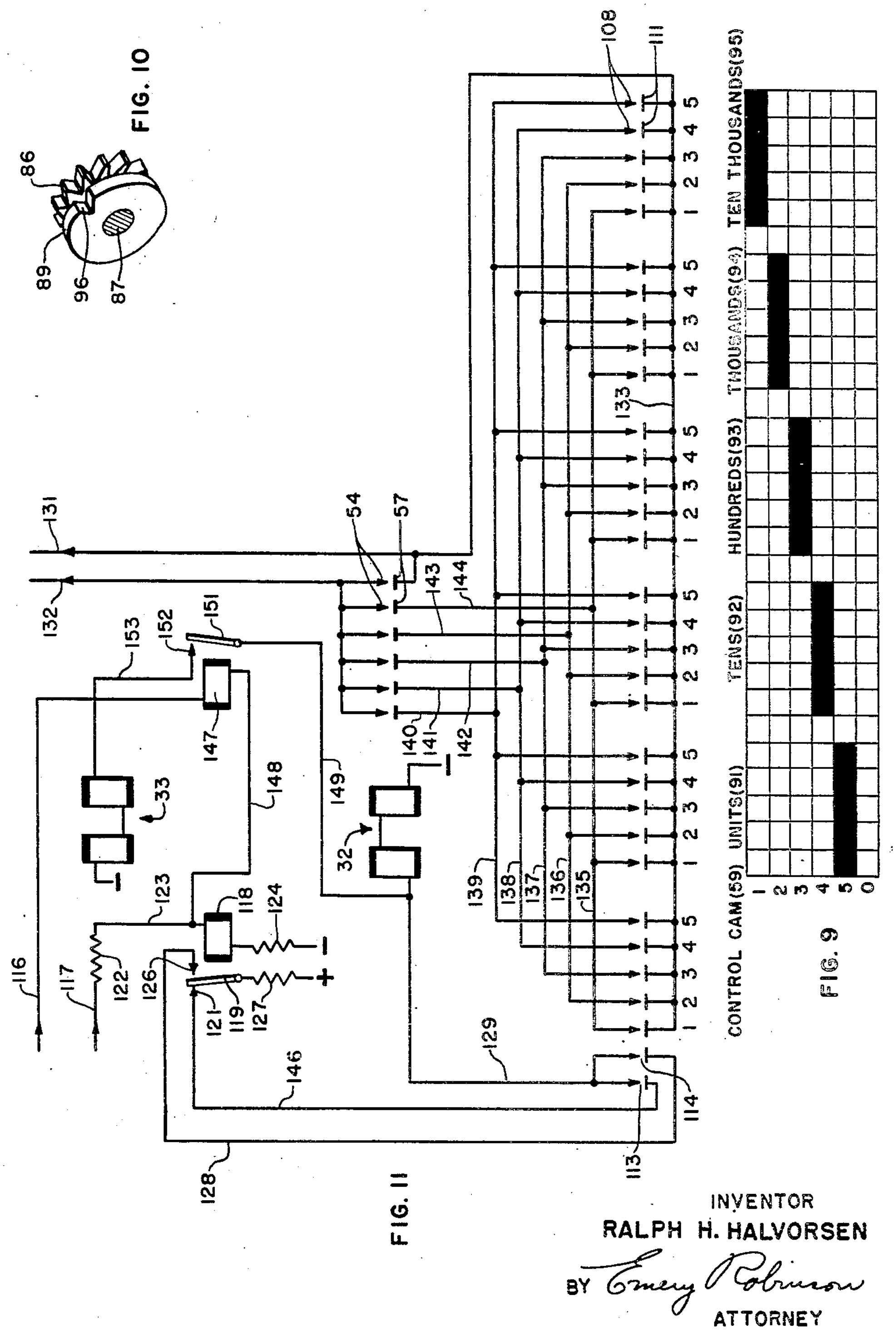
Fig. 9 is a schematic representation of the sequence cam.
Fig. 10 is a fragmentary isometric view of a stepping ratchet for one of the numbering cams.
Fig. 11 is a schematic wiring diagram of the electrical circuits in the invention.

Mounted on the shaft 67 is a sequence cam 101 which is stepped with the gear 66 also mounted on the shaft 67. The sequence cam 101 is for the purpose of controlling the sequence of operation of the code drums 91–95. Fig. 9 shows schematically the cutout portions of the sequence cam 101. The blackened spots in the diagram of Fig. 9 represent the cutout portions of the sequence cam 101.

The code drums 91–95 are each associated with five gooseneck followers 102. The gooseneck followers 102 corresponding to each of the code drums 91–95 are mounted suitably in groups on bolts 103 positioned securely in brackets 104. Each of the gooseneck levers 102 is provided with follower lugs 106 and 107 which cooperate respectively with the sequence cam 101 and the corresponding code drum 91–95. The code drums 91–95 are each notched according to the pattern shown in Fig. 7 (the blackened spots representing cutout portions) which corresponds to the Baudot code for the numerical digits zero to nine. When the sequence cam 101 occupies its zero position, since there are no notches therein opposite any of the lugs 106 at this time, all of the gooseneck followers 102 are held in the position shown in Fig. 3. When the sequence cam 101 is stepped to its No. 1 position, notches in the cam 101 are presented opposite the lugs 106 on all the followers 102 associated with the ten thousands drum 95, and thus under this condition the ten thousands code drum 95 controls the clockwise pivotal movement of these followers 102. In the No. 2 position of the sequence cam 101, the notches therein are opposite the followers 102 associated with the thousands code drum 94. Likewise the sequence cam 101 permits the hundreds code drum 93 to control its associated followers 102 when the cam 101 occupies its No. 3 position; the tens code drum 92 is permitted to control its associated followers 102 when the cam 101 occupies its No. 4 position; and the units code drum 91 is permitted to control its associated followers 102 when the cam 101 occupies its No. 5 position.

Each of the gooseneck followers 102 controls the position of a movable spring contact member 108 which is mounted suitably in an insulator block 109 secured to the base 16. The spring contact members 108 tend continuously to move towards associated stationary contact members 111 also mounted suitably in the insulator block 109. Any spring contact member 108 is permitted to close against its corresponding stationary contact member 111 whenever the associated gooseneck follower 102 is permitted to move clockwise, which occurs only when both lugs 106 and 107 on such follower are opposite notches in the sequence cam 101 and one of the code drums 91–95 respectively.

Figures 3, 4, 8:
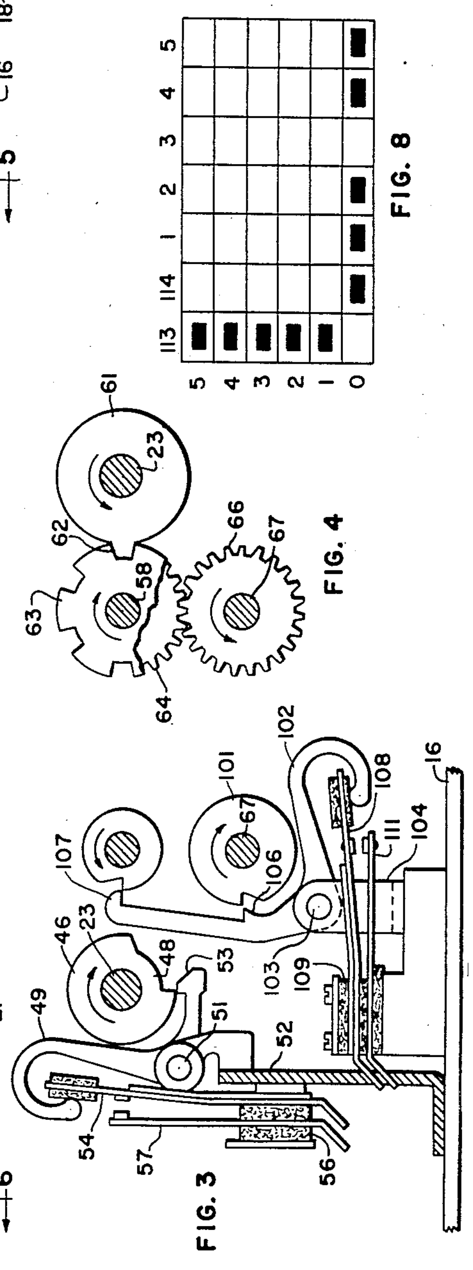
Fig. 3 is a sectional view taken substantially along the line 3—3 of Fig. 1, but also showing the sequence cam.
Fig. 4 is a sectional view taken substantially along the line 4—4 of Fig. 1, and showing the gearing mechanism used in the invention.
Fig. 8 is a schematic representation of the control cam.

The sleeve 59 is notched in a manner as shown in Fig. 8 and serves as a control cam or drum. A group of seven gooseneck levers 112 are provided which cooperate with the control cam 59, and are like the gooseneck levers 102 except that no lug is provided which is similar to the lug 106 on the gooseneck levers 102. The two gooseneck levers 112 in the furthest leftward positions (Figs. 1 and 2) are strictly control levers whereas the remaining five gooseneck levers 112 in the rightward positions are utilized for the generation of signals. Each of the five gooseneck levers 112 in the rightward position is mounted pivotally on a bolt 103 secured in one of the brackets 104 and each is associated with a spring contact 108. The spring contacts 108, cooperable with the five rightward gooseneck levers 112, tend continuously to move clockwise and thereby engage their associated stationary contact members 111. For convenience in the description of the circuit shown in Fig. 11 the spring contact member and stationary contact member associated with the two leftwardmost gooseneck levers 112 will be referred to respectively as contact pairs 113 and 114. The contact pairs 113 and 114 are closed in the same manner as the movable contact members 108 and stationary contact members 111 are closed.

Fig. 8 shows schematically the notches in the control cam 59 and from this figure it is apparent that in the zero position of the control cam 59 the gooseneck levers 112 in the Nos. 1, 2, 4, and 5 positions and the gooseneck lever 112 associated with the contact pair 114 are each permitted to pivot clockwise and thereby enable the closure of their associated contact pairs. In all other positions of the control cam 59 notches therein only present themselves opposite the gooseneck lever 112 associated with the contact pair 113, and consequently only the contact pair 113 is closed while the control cam 59 occupies all but its zero position.

Reference should now be made to the circuit diagram shown in Fig. 11. In this figure the magnets 32 and 33 are shown schematically and also the contacts 54 and 57 controlled by the gooseneck levers 49 as well as the contacts associated with the gooseneck levers 102 and 112 are shown. A pair of leads 116 and 117 are the control leads for the numbering transmitter, which determine whether the same number as is set up on the code drums 91–95 will be generated and transmitted or the next consecutive number will be generated and transmitted. During normal conditions the control cam 59 occupies its zero position at which time, as is shown by Fig. 8, the contact pair 113 is open and the contact pair 114 is closed. So long as a relay 118 remains de-energized its armature 119 remains against a back contact 121 and no energizing circuit can be initiated to the magnet 32, for the contact pair 113 is open when the control cam 59 occupies its zero position. If a circuit is established to the relay 118 over the lead 117, through a resistance 122, over a lead 123, through the relay 118, through a resistance 124, to negative battery, the armature 119 is pulled up to make with a contact 126. When the armature 119 closes against the contact 126 at this time a circuit is established from positive battery, through a resistance 127, through the contact pair 114 (closed when the control cam 59 occupies its zero position), over a lead 129, through the magnet 32 to negative battery.

Upon energization of the magnet 32, the armature 34 is pulled up, the pawls 37 and 38 thereby being permitted to engage the drive ratchet 26 which causes the driven member 31 and sleeve 30 to commence rotating. When the sleeve rotates through the first revolution the movable contacts 54 are sequentially closed against the stationary contacts 57. At this same time it will be recalled that the movable contacts 108 and stationary contacts 111 in the Nos. 1, 2, 4, and 5 positions of the control cam 59 are also closed due to the notches in the zero position of the control cam 59. Therefore while the sleeve 30 makes its first revolution after the energization of the magnet 32 a permutation signal is induced into a pair of transmitting leads 131 and 132. The circuit over which this signal passes extends from the lead 131, over a lead 133 sequentially through the closed contacts 108 and 111 associated with the control cam 59, sequentially over leads 135–139, sequentially over leads 140–144, through the sequentially closed contact pairs 54 and 57, to the lead 132. Upon completing the rotation of the sleeve 30, the start stop cam 47 is brought into a position so as to close its associated contacts 54 and 57 and thereby bridge the leads 131 and 132. It is to be noted that this signal comprises two current impulses, followed by a no current impulse, followed by two more current impulses, and in accordance with the well known Baudot code such a signal is a "Figures" or shift signal. When such a signal is transmitted over the line to outlying stations, each station printer is conditioned for printing upper case characters.

Just prior to the completion of the first revolution of the cam sleeve 30, the single toothed gear wheel 61 advances the gears 63, 64, and 66, a step which amounts to a rotation of one-sixth of a complete revolution. When these gears are so stepped the control cam 59 and sequence cam 101 are each moved from their zero to their No. 1 position. It will be recalled that when the control cam occupies its No. 1 position a notch therein is opposite the gooseneck follower 112 associated with the contact pair 113 and therefore at this time the contact pair 113 is closed. Thus a circuit is established to the clutch magnet 32 from positive battery, through the resistance 127, through the armature 119 and contact 121 (since the relay 118 is normally de-energized at this time), over a lead 146, through the contact pair 113, over the lead 129, through the magnet 32, to negative battery. When the sequence cam 101 occupies its No. 1 position, notches in the sequence cam 101 are opposite the lugs 106 on all the gooseneck levers 102 associated with the ten thousands code drum 95, and thus the position of these gooseneck levers 102 is controlled, at this time, entirely by the ten thousands code drum 95. As the cam sleeve 30 rotates through its second revolution in response to the energization of the magnet 32 a permutation signal corresponding to the setting of the ten thousands code drum 95 is impressed to the line leads 131 and 132 over circuits extending from the lead 131, over the lead 133, through the permutation of closed contacts 108 and 111 as determined by the permutation of notches in the ten thousands code drum 95 presented to the gooseneck followers 102, over the corresponding permutation of leads 135–139, over the corresponding permutation of leads 140–144, through the sequentially closed contacts 54 and 57, to the lead 132. Thus a permutation signal, as determined by the notches in the ten thousands code drum 95 which present themselves opposite the associated gooseneck follower 102, is transmitted to the line leads 131 and 132. Near the end of the revolution of the cam sleeve 30, the single tooth 62 on the gear 61 engages and steps the gear 63 another step of one-sixth of a revolution. This stepping of the gear 63 advances the control cam 59 and sequence cam 101 to their No. 2 positions.

When the control cam 59 occupies its No. 2 position the contact pair 113 closes and again the magnet 32 is energized and caused to pull up its armature 34, thereby releasing the sleeve 30 for another revolution. When the sequence cam 101 occupies its No. 2 position, notches therein are opposite the follower gooseneck levers 102 associated with the thousands code drum 94. Therefore this group of gooseneck levers 102 associated with the code drum 94 are controlled in accordance with the notches in the thousands code drum 94. As the cam sleeve 30 rotates at this time a number indicative of the thousands digit is impressed on a circuit extending from the lead 131, over the lead 133, through the permutation of closed contacts 108 and 111 as determined by the permutation of notches in the thousands code drum 94 presented to the gooseneck followers 102 associated with the thousands code drum 94, over the corresponding permutation of leads 135–139, over the corresponding permutation of leads 140–144, through the corresponding permutation of sequentially closed contacts 54 and 57, to the lead 132. Due to the fact that the single toothed gear 61 advances the control cam 59 and sequence cam 101 to their No. 3 positions near the end of the revolution of the cam sleeve 30 during which transmission of the thousands digit takes place, the contact pair 113 is again closed and the hundreds digit is transmitted in the same manner as the ten thousands and thousands digits are transmitted. The tens and units digits are also transmitted in the same manner.

Near the end of the transmission of the units digit, that is, near the completion of the sixth revolution of the transmitting cam sleeve 30 the single toothed gear 61 advances the control cam 59 and sequence cam 101 from their No. 5 to their zero positions. In the zero position of the sequence cam 101 there are no notches therein presented to any of the gooseneck followers 102 and therefore none of the contacts 103 and 111 close. In the zero position of the control cam 59, as is apparent from Fig. 8, the contact pair 113 is not permitted to close and consequently the magnet 32 is not reenergized at this time to permit another revolution of the cam sleeve 30. However, in the zero position of the control cam 59, the contact pair 114 is permitted to close and thus the apparatus is conditioned for response upon the next subsequent energization of the relay 118. When the relay 118 is again energized, the armature 119 is pulled up so as to complete a circuit, heretofore traced, to the magnet 32.

When an impulse of current is received over the lead 116, a relay 147 and the relay 118 are both energized over the circuit extending from the lead 116, through the relay 147, over a lead 148, over the lead 123, through the relay 118, through the resistance 124 to negative battery. Due to the energization of the relay 118 a cycle is initiated for transmitting a number consisting of five digits, as has already been described. When the relay 118 is energized by the impulse from the lead 116, upon energization of the magnet 32, a circuit is also established to the magnet 33 from positive battery, through the resistance 127, through the armature 119 and contact 126, over the lead 128, through the contact 114, over the lead 129, over a lead 149, through an armature 151 and contact 152 (the armature 151 being pulled up by its relay 147 at this time), over a lead 153, through the magnet 33, to negative battery. When the magnet 33 is energized in this manner it pulls up its armature 36 and thereby releases the shaft 69 for rotation. It will be recalled that with each revolution of the shaft 69, the code drums 91–95 are stepped to the next consecutive number position. At the same time that the magnet 33 is energized by the circuit extending through the contact 114, the magnet 32 is also energized to thereby release the sleeve 30 for rotation. As the control cam 59 occupies its zero position at this time a Figures signal is transmitted. Just as the sleeve 30 nears the end of its first revolution the contact pair 114 opens and the contact pair 113 closes, and if the armature 119 remains pulled up the circuits to both magnets 32 and 33 are broken at the contact pair 114. Under this condition the code drums 91–95 are stepped to the next consecutive number position and then stopped, and the sleeve 30 rotates one revolution and stops. Thereafter when the circuit to the relay 118 is broken a circuit is again established to the magnet 32, but no circuit is established to the magnet 33 because in order for the armature 119 to fall back against the contact 121 it is necessary that the relay 118 be de-energized and when the relay 118 is de-energized the relay 147 is also de-energized. Therefore, whenever a circuit is established to the magnet 32 through the contact pair 113 it is impossible to establish a circuit to the magnet 33 as the circuit to the magnet 33 is broken at this time at the armature 151 and contact 152.

From the above it is apparent that the magnet 33 is energized to cause a stepping of the code drums 91–95 only when a Figures signal is being transmitted under the control of the control cam 59. Thereafter the number corresponding to the settings of the code drums 91–95 is transmitted.

If an impulse is received over either the lead 116 or 117 during the transmission of a number sequence, the effect is merely to break the circuit to the magnet 32 thereby stopping transmission. However, as soon as the relay 118 is de-energized so as to permit its armature 119 to fall back and again complete the circuit to the magnet 32, the magnet 147, if energized previously, will also become de-energized at the same time and any circuit to the magnet 33 will be broken at the armature 151 and contact 152. Thus any impulse over either the lead 116 or 117 while a number is being transmitted merely interrupts the transmission which is resumed upon the cessation of such impulse.

From the above description it is apparent that the present invention provides an efficient numbering transmitter wherein it is possible to transmit successively the same number any number of times or consecutive numbers can be transmitted successively. It is fully within the realm of the present invention that the number of code drums may be increased or decreased, with a corresponding increase or decrease in the number of stepping positions of the control and sequence cams. Likewise it is contemplated that other identifying signals may be transmitted under the control of either the control cam or code drums. These and many other changes may be made without departing from the spirit or scope of the invention.

What is claimed is:

1. In an automatic telegraph transmitter having a signaling channel connected thereto, a plurality of signal generating means for generating permutative signals, each of said permutative signals representing numerical digits, means for advancing each of said signal generating means to vary the numerical digits in consecutive numerical order, sequentially operable means for successively connecting each of the signal generating means to the signaling channel, a first circuit for operating said sequentially operable means to connect each of said signal generating means to the signaling channel, whereby consecutively generated permutative signals represent identical multi-digit numerals, and a second circuit including means for actuating the advancing means to advance one or more of said signal generating means to generate consecutive multi-digit numerical signals consecutively, said second circuit also including the circuit for operating the sequentially operable means of the first circuit to transmit the generated multi-digit numerical signal to the signalling channel.

2. In combination with a telegraph transmitter, a plurality of code drums, each of said drums being permutatively coded with numeral designations, means for stepping said code drums successively to positions representing consecutive numerals, means for successively sensing the permutative numerical designations on all of the code drums, means for transmitting a numeral signal as determined by the sensing of the permutative numerical designation on all of said code drums, a first selective circuit effective upon successive operations thereof for simultaneously initiating said stepping means and said transmitting means, whereby consecutive numeral signals are transmitted by said transmitting means, and a second selective circuit effective upon the operation thereof for indicating said transmitting means, whereby a numeral signal identical to the last previously transmitted numeral signal is transmitted.

3. In combination with a telegraph transmitter, a plurality of code drums, each of said code drums being permutatively coded with numeral designations, means for stepping one or more said code drums successively to positions representing consecutive numerals, means for successively sensing the permutative numerical designation on each of the code drums, means for transmitting a numeral signal as determined by the sensing of the permutative numerical designations on each of said code drums, a first selective circuit effective upon successive operations thereof for simultaneously initiating said stepping means and said transmitting means, whereby consecutive numeral signals are transmitted by said transmitting means, a second selective circuit effective upon the operation thereof for initiating said transmitting means, whereby a numeral signal identical to the last previously transmitted numeral signal is transmitted, and means within the first circuit to prevent operation of said stepping means during transmission of a numeral signal by said transmitting means.

4. In a numbering transmitter, a plurality of code drums, each of said code drums being coded in accordance with the digits 0 to 9 inclusive, a transmitting means associated with each of said code drums, said code drums being designed to control the transmission of a number including a digit for each of said code drums, means for stepping said code drums successively to positions corresponding to consecutive numbers, cam means for actuating said transmitting means sequentially, a first selective circuit effective upon operation thereof for initiating a stepping operation by said stepping means and upon completion of said stepping operation for initiating an operation of said cam means, whereby a number having as many digits as there are code drums and next consecutive to the last previously transmitted number is transmitted by said transmitting means, and a second selective circuit effective upon the operation thereof for actuating only said cam means, whereby a number identical to the last previously transmitted number is transmitted by said transmitting means.

5. In a numbering transmitter, a plurality of settable code drums for controlling the transmission of number signals, each of said code drums being adapted to control transmission of a single digit of a multidigit number, means for stepping said code drums to enable transmission of consecutive numbers, a transmitting mechanism for transmitting numbers comprising digits as determined by said code drums, clutch means for actuating said stepping means, another clutch means for actuating said transmitting means, and a pair of selective circuits for controlling both of said clutch means, whereby the first of said pair of circuits is effective upon selective energization to actuate both of said clutch means and thereby cause transmission of a number next consecutive to the last previously transmitted number and the second of said pair of circuits is effective upon selective energization only to actuate said last recited clutch thereby causing transmission of a number identical to the last previously transmitted number.

6. In a numbering transmitter, a plurality of settable code drums for controlling the transmission of number signals, a plurality of contact members associated with each of said code drums, each of said code drums being adapted to permutatably close the plurality of contact members associated therewith to thereby set up digit permutations on said contact numbers, means for transmitting said digit permutations set up on said contact members, means for closing the groups of contact members associated with each of said code drums successively to enable transmission of a multidigit number by said transmitting means, means for setting said code drums to thereby vary said digit permutations on said contact members, and a selectively operable pair of circuits for initiating transmission of number signals comprising said digit permutations, one of said pair of circuits beng effective upon selection to initiate operation of said transmitting means and also for actuating said setting means, whereby a number next consecutive to the last transmitted number is transmitted, said second circuit being effective upon selection to only initiate operation of said transmitting means whereby a number identical to the last transmitted number is transmitted.

7. In an automatic numbering transmitter, a plurality of means for generating numerical permutation signals, means for stepping one or more of the signal generating means to set up consecutive multi-digit numbers, sequentially operable means for successively transmitting each of the numerical permutation signals set up on each of the signaling generating means to a signaling channel, a control circuit including means for actuating the sequentially operable means, and a second circuit including means to operate the stepping means and simultaneously the means for actuating the sequentially operable means of the first circuit.

8. In an automatic telegraph transmitter, a plurality of settable means for generating numerical permutation signals, sequentially operable means for separately connecting each of the signal generating means to a transmission line, a first control circuit comprising means for operating the sequentially operable means whereby a numerical permutation signal as determined by the setting of all of the signal generating means is transmitted to the transmission line, a second control circuit comprising the means for operating the sequentially operating means of the first circuit, and means operated by energization of the second control circuit for advancing the numerical setting of one or more of the signal generating means to set up the next consecutive number.

9. In a numbering transmitter, a plurality of code drums for setting up numerical code signals, a sequentially operated series of contacts, means actuated by the code setting of the drums for transmitting the numerical coded signal to the series of contacts, a cam shaft, a series of cams mounted on the shaft for closing sequentially the contacts, a power shaft, a clutch interconnecting the cam shaft and the power shaft, a solenoid for operating the clutch, a control circuit responsive to an incoming impulse for operating the solenoid to engage the clutch to move the cams to sequentially close the contacts, whereby the coded signal set on the drums is transmitted, stepping means for advancing the numerical code setting of the drums in one increment integrals, a second clutch interconnecting the power shaft and the stepping means, a second solenoid for operating the second clutch, and a second control circuit responsive to an incoming impulse for operating the second clutch to advance the setting of the code drums one increment, said second control circuit also including the means to operate the first solenoid to transmit the coded signal set on the drums.

10. In an automatic numbering transmitter, means for generating numerical signals, means for generating a control signals, means for stepping the signal generating means to set up consecutive numbers, sequentially operable means for transmitting the control signal and then the numerical signal to a signaling channel, a control circuit including means for actuating the sequentially operable means, and a second control circuit including means for actuating the sequentially operable means, said second circuit also including means for operating the stepping means during transmission of the control signal.

11. In an automatic numbering transmitter, means for generating a preselected control signal, a first code drum having consecutive numerical permutations thereon, means for stepping said first code drum in one step increments, a second code drum having consecutive numerical permutations thereon, means for stepping said second drum in one step increments, means connected to the first drum for preventing the stepping of said second code drum until said first drum has stepped a predetermined number of increments, sensing means for generating numerical signal in accordance with the pemutations on the code drums, a first selective control circuit including means for sequentially connecting the control signal generating means and then the sensing means associated with the first and second code drums respectively to a transmission channel, and a second selective control circuit including the sequentially operable means of the first control circuit, said circuit also including means for operating the stepping means during the transmission of the preselected control signal.

12. In an automatic numbering transmitter, a plurality of code drums positioned alongside of each other, each of said code drums having formed therein a plurality of consecutive numerical permutations, means arranged in groups associated with each code drum for sensing the respective numerical permutations in each code drum, means for stepping a first one of said code drums in one step increments to successively present numerical permutations to its associated group of sensing means, means for successively stepping each succeeding adjoining code drum upon completion of a predetermined number of stepping operations by its preceding code drum to present consecutive numerical permutations to their respective associated groups of sensing means, a control signal generating means, a plurality of transmitting contacts connected to a signaling channel, a first sequentially operable means for closing the transmitting contacts, a second sequentially operable means for connecting the control signal generating means and then in subsequent order each group of sensing means to the transmitting contacts, a first selective control circuit including means for initiating repeative operation of said first sequentially operable means, said first circuit means also initiating operation of said second sequentially operable means whereby a control signal and then a multi-unit numerical signal is transmitted over the signaling channel, and a second selective control circuit for initiating operation of said first and second sequentially operable means, said second circuit also including means for initiating operation of said stepping means during transmission of the control signal whereby the next consecutive multi-unit numerical signal is transmitted over said signaling channel.

RALPH H. HALVORSEN.

REFERENCES CITED

The following references are of record in the file of this patent:

UNITED STATES PATENTS

| Number | Name | Date |
|---|---|---|
| 1,971,686 | Kinkead | Aug. 28, 1934 |
| 2,116,372 | Weld | May 3, 1938 |
| 2,193,809 | Dirkes et al. | Mar. 19, 1940 |